(12) United States Patent
Minor et al.

(10) Patent No.: US 8,365,405 B2
(45) Date of Patent: Feb. 5, 2013

(54) PREFORMS AND RELATED METHODS FOR REPAIRING ABRADABLE SEALS OF GAS TURBINE ENGINES

(75) Inventors: Michael Minor, Arlington, TX (US); Jacob A. Hall, Fort Worth, TX (US)

(73) Assignee: United Technologies Corp., Hartford, CT (US)

( * ) Notice: Subject to any disclaimer, the term of this patent is extended or adjusted under 35 U.S.C. 154(b) by 1099 days.

(21) Appl. No.: 12/199,171

(22) Filed: Aug. 27, 2008

(65) Prior Publication Data
US 2010/0050408 A1 Mar. 4, 2010

(51) Int. Cl.
*B23P 6/00* (2006.01)
(52) U.S. Cl. .................. 29/889.1; 29/402.02; 29/402.13
(58) Field of Classification Search ............... 29/402.02, 29/402.13, 428, 889.1; 228/119; 428/548, 428/555, 636
See application file for complete search history.

(56) References Cited

U.S. PATENT DOCUMENTS

| | | | | |
|---|---|---|---|---|
| 3,053,694 | A | * | 9/1962 | Daunt et al. .................. 427/230 |
| 4,273,824 | A | * | 6/1981 | McComas et al. ................. 442/7 |
| 4,299,865 | A | * | 11/1981 | Clingman et al. ............ 427/243 |
| 4,536,127 | A | * | 8/1985 | Rossmann et al. ......... 415/173.4 |
| 4,704,332 | A | * | 11/1987 | Brennan et al. ............... 428/428 |
| 4,924,581 | A | | 5/1990 | Jakobsen |
| 5,359,770 | A | * | 11/1994 | Brown et al. ................. 29/889.1 |
| 5,486,090 | A | | 1/1996 | Thompson et al. |
| 5,609,469 | A | | 3/1997 | Worley et al. |
| 5,655,701 | A | * | 8/1997 | Quattrocchi et al. .......... 228/119 |
| 5,705,281 | A | * | 1/1998 | Reeves et al. ................. 428/553 |
| 5,741,378 | A | * | 4/1998 | Pietruska et al. .............. 148/674 |
| 5,972,424 | A | * | 10/1999 | Draghi et al. ................. 29/889.1 |
| 6,048,170 | A | | 4/2000 | Dodd |
| 6,113,349 | A | | 9/2000 | Bagepalli et al. |
| 6,233,822 | B1 | | 5/2001 | Grossklaus, Jr. et al. |
| 6,637,643 | B2 | | 10/2003 | Hasz et al. |
| 6,733,233 | B2 | | 5/2004 | Jasklowski et al. |
| 6,884,470 | B2 | | 4/2005 | Gorman |
| 6,914,210 | B2 | | 7/2005 | Grossklaus, Jr. et al. |
| 7,001,152 | B2 | | 2/2006 | Paquet et al. |
| 7,278,208 | B2 | * | 10/2007 | Le Saint et al. .............. 29/889.1 |
| 7,653,994 | B2 | * | 2/2010 | Dasilva et al. ............... 29/889.1 |
| 2001/0052375 | A1 | * | 12/2001 | Sievers et al. ................. 148/516 |
| 2011/0217484 | A1 | * | 9/2011 | Lubcke et al. ................. 427/569 |

FOREIGN PATENT DOCUMENTS

| | | |
|---|---|---|
| EP | 0753376 A | 1/1997 |
| EP | 753376 A1 * | 1/1997 |
| EP | 1486286 A | 12/2004 |
| EP | 2071137 A | 6/2009 |

OTHER PUBLICATIONS

European Search Report mailed on Dec. 22, 2009 for EP09250979.

* cited by examiner

*Primary Examiner* — Alexander P Taousakis
(74) *Attorney, Agent, or Firm* — Carlson, Gaskey & Olds PC

(57) ABSTRACT

Methods for repairing abradable seals of gas turbine engines include providing an abradable seal component of a gas turbine engine, the seal component having a structural substrate; providing a first preform to restore the structural substrate; and providing a second preform to form an abradable layer of the component. Preforms include a multilayer stack having a first layer and a second layer.

8 Claims, 3 Drawing Sheets

PREFORMS AND RELATED METHODS FOR REPAIRING ABRADABLE SEALS OF GAS TURBINE ENGINES

BACKGROUND

1. Technical Field

The disclosure generally relates to gas turbine engine repair.

2. Description of the Related Art

A typical gas turbine engine incorporates a compressor section and a turbine section, each of which includes rotatable blades and stationary vanes. Within a surrounding engine casing, the radial outermost tips of the blades are positioned in close proximity to outer air seals. Outer air seals are parts of shroud assemblies mounted within the engine casing. Each outer air seal typically incorporates multiple segments that are annularly arranged within the engine casing, with the inner diameter surfaces of the segments being located closest to the blade tips.

Conventionally, the inner diameter surfaces of the outer air seal segments incorporate abradable material. The abradable material wears due to contact with the rotating blades and forms conformal seals with the blade tips. Notably, repair of an outer air seal segment of which the abradable material has degraded beyond desired limits oftentimes involves replacing the segment.

SUMMARY

Preforms and related methods for repairing abradable seals of gas turbine engines are provided. In this regard, an exemplary embodiment of a method for repairing an abradable seal of a gas turbine engine includes providing an abradable seal component of a gas turbine engine, the seal component having a structural substrate; providing a first preform to restore the structural substrate; and providing a second preform to form an abradable layer of the component.

Another exemplary embodiment of a method for repairing an abradable seal of a gas turbine engine includes providing an abradable seal component of a gas turbine engine, the seal component having a structural substrate; and using a preform to simultaneously restore the structural substrate and form an abradable layer of the component.

An exemplary embodiment of a preform for repairing an abradable seal component of a gas turbine engine, the seal component having a structural substrate and an abradable layer, said preform includes a multilayer stack having a first layer and a second layer; the first layer being operative to bond the multilayer stack to the structural substrate, the first layer including structural material corresponding to material of the structural substrate and braze material compatible with the structural material; the second layer including abradable material; the multilayer stack being operative to bond to the structural substrate of the abradable seal component during a brazing process such that the second layer forms a replacemtn abradable layer of the abradable seal component.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Preforms and related methods for repairing abradable seals of gas turbine engines are provided, several exemplary embodiments of which will be described in detail. In this regard, some embodiments involve the repair of outer air seal segments that conventionally would be removed from service due to thinning of the base metal that supports the abradable material. Notably, this can be accomplished by providing a preform that incorporates both base metal, abradable material and associated braze material for repairing a degraded outer air seal segment. Specifically, a replacement abradable layer is provided by the preform.

Figure 1:
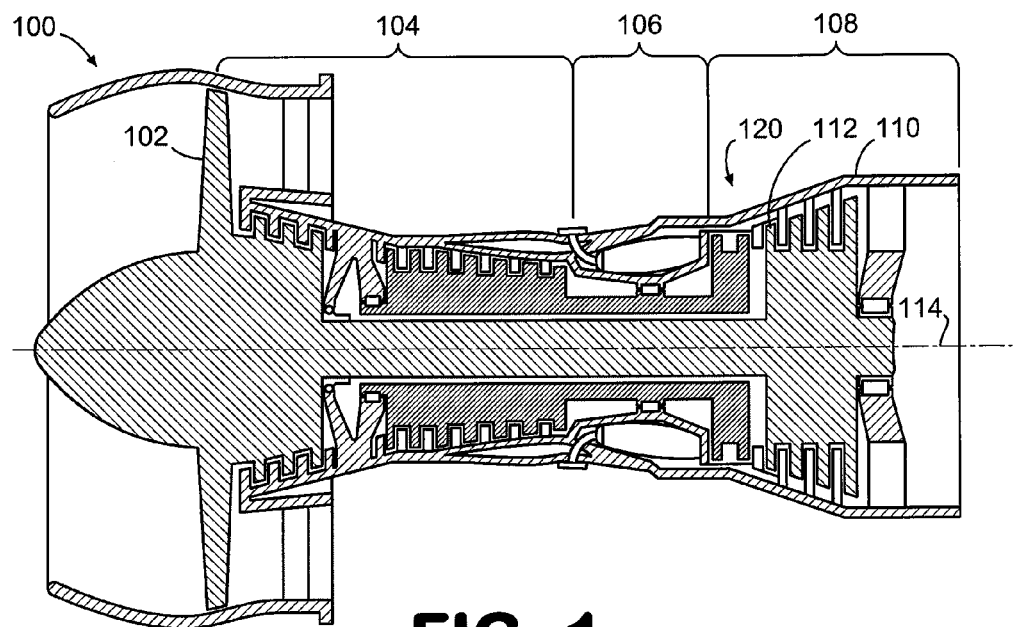
FIG. 1 is a schematic diagram depicting an exemplary embodiment of a gas turbine engine.

Referring now in more detail to the drawings, FIG. 1 is a schematic diagram depicting an exemplary embodiment of a gas turbine engine. As shown in FIG. 1, engine 100 incorporates a fan 102, a compressor section 104, a combustion section 106 and a turbine section 108. Various components of the engine are housed within an engine casing 110 (such as a blade 112 of the low-pressure turbine) that extends along a longitudinal axis 114. Although engine 100 is configured as a turbofan engine, there is no intention to limit the concepts described herein to use with turbofan engines as various other configurations of gas turbine engines can be used.

Figure 2:
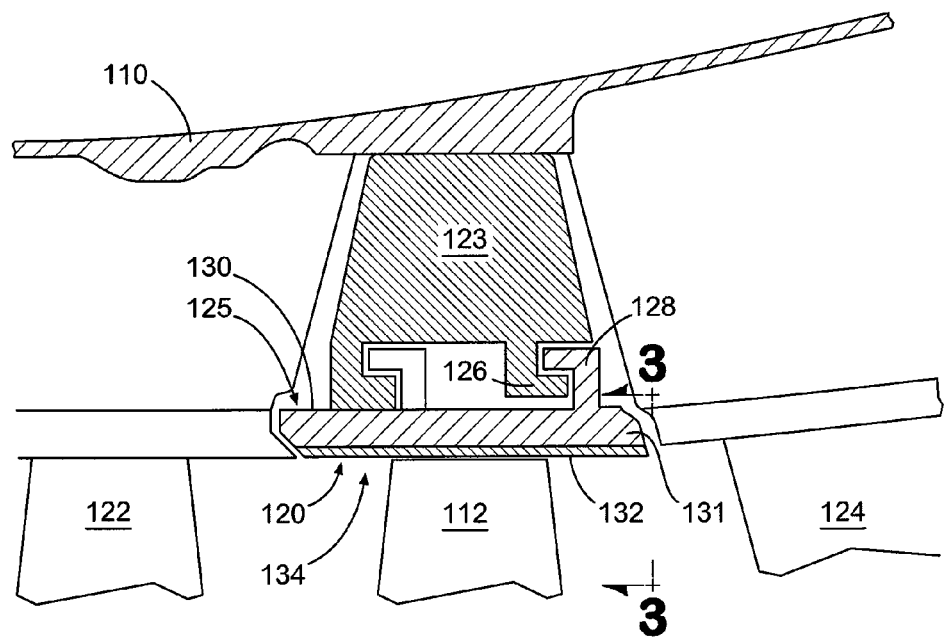
FIG. 2 is a partially cut-away, schematic diagram depicting a portion of the embodiment of FIG. 1.

A portion of engine 100 is depicted in greater detail in the schematic diagram of FIG. 2. In particular, FIG. 2 depicts a portion of blade 112 and a corresponding portion of a shroud assembly 120 that are located within engine casing 110. Notably, blade 112 is positioned between vanes 122 and 124, detail of which has been omitted from FIG. 2 for ease of illustration and description.

As shown in FIG. 2, shroud assembly 120 is positioned between the rotating blades 112 and the casing 110. The shroud assembly 120 generally includes an annular mounting ring 123 and an annular outer air seal 125 that is attached to the mounting ring 123 and positioned adjacent to the blades 112. Various other seals are provided both forward and aft of the shroud assembly 120. However, these various seals are not relevant to this discussion.

Attachment of the outer air seal 125 to the mounting ring 123 in the embodiment of FIG. 2 may be facilitated by interlocking flanges. Specifically, the mounting ring 123 includes flanges (e.g., flange 126) that engage corresponding flanges (e.g., flange 128) of the outer air seal 125. Other attachment techniques may be used in other embodiments, which may include a mounting ring.

Figure 3:
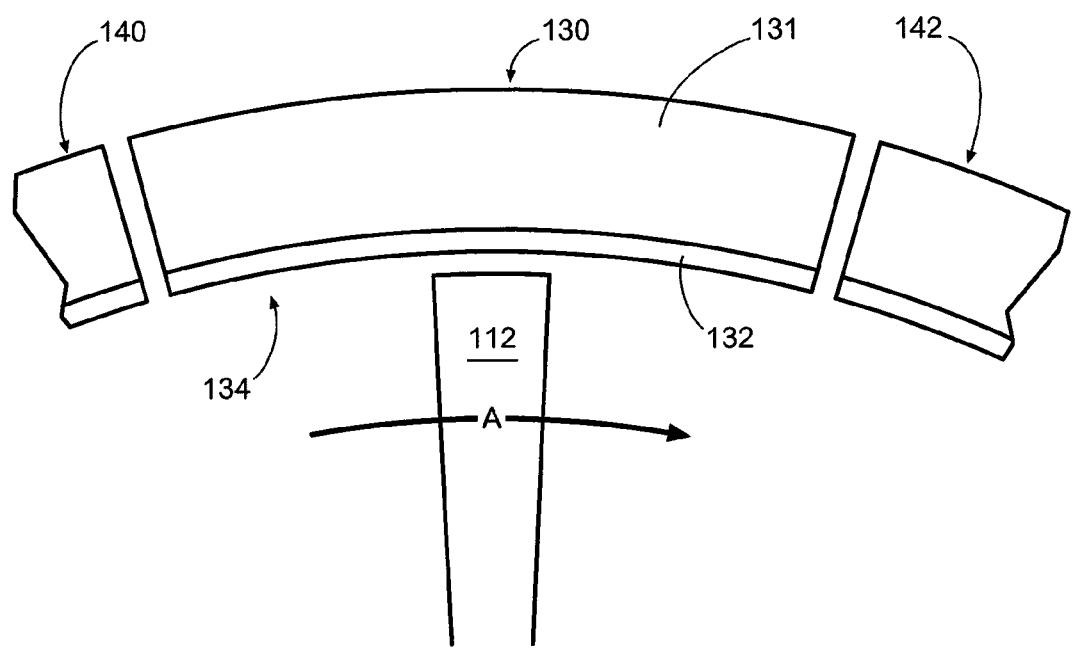
FIG. 3 is a partially cut-away, schematic diagram depicting a portion of the shroud assembly of the embodiment of FIGS. 1 and 2.

The annular configuration of the outer air seal 125 is formed by assembling multiple abradable air seal components or segments, e.g., arcuate segment 130 shown in FIG. 2 and FIG. 3. Outer air seal segment 130 includes a structural substrate 131 of base material (e.g., cobalt) and an abradable layer 132 that is supported by substrate 131. Specifically, abradable layer 132 is located on a radially inner diameter surface 134 that is located adjacent to the tips of the blades (e.g., blade 112) when installed.

As shown in FIG. 3, adjacent segments 140, 130 and 142 of outer air seal 125 are oriented in end-to-end relationship. Generally, ends of adjacent segments interlock with each other. Various interlocking configurations can be used.

As mentioned above, the abradable layer (e.g., abradable layer 132) of a segment can wear beyond desired limits, which can lead to removal and replacement of the abradable material at the radially inner diameter surface (e.g., surface 134) of the segment. For example, the abradable layer 132 may wear during engine operation and/or rotation of blades 112 in a rotational direction A. However, wear of the associated structural substrate beyond desired limits oftentimes results in replacing the segment entirely.

Figure 4:
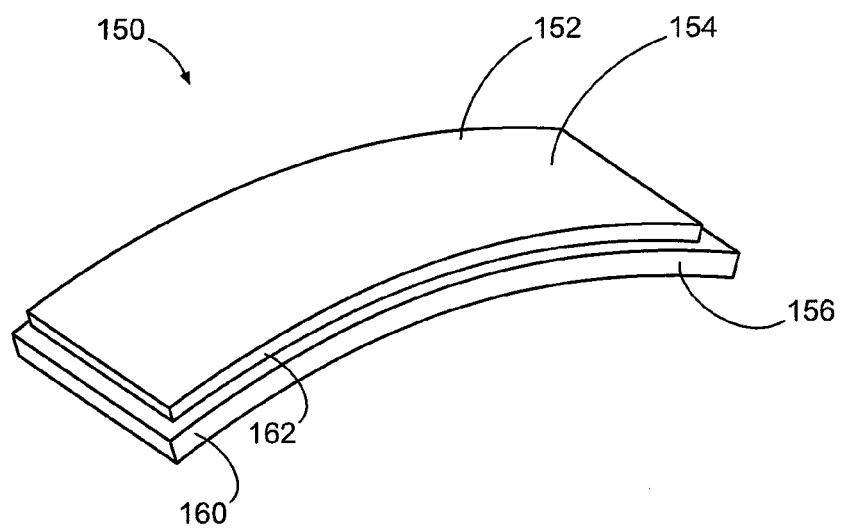
FIG. 4 is a schematic diagram depicting an exemplary embodiment of a preform for repairing an abradable seal.

In this regard, FIG. 4 is a schematic diagram depicting an exemplary embodiment of a preform for repairing an abradable seal. As shown in FIG. 4, preform 150 is elongate and arcuate in shape and is generally configured to conform to a corresponding radially inner diameter surface of an outer air seal segment. In this embodiment, a radially outer diameter surface 152 of the preform 150 is convex in order to engage a corresponding concave inner diameter surface of a segment (e.g., surface 134 of FIG. 3).

Preform 150 is a multilayer stack of material that includes a first layer 154 and a second layer 156, with each such layer including different formulations. In this embodiment, the first layer 154 is used to bond the multilayer stack to the structural substrate of a segment and includes a blend of structural braze material and structural material. In this embodiment, the structural material corresponds to material of the structural substrate. By way of example, the structural material can be cobalt when the structural substrate comprises cobalt. The second layer 156 is formed of abradable material. Notably, an axial outer periphery 160 of second layer 156 extends outwardly beyond an axial outer periphery 162 of first layer 154. This size difference of the preform layers in this embodiment tends to mitigate differences in shrinkage of the materials during bonding to an outer air seal segment.

In some embodiments (such as when the substrate material is formed of cobalt), the first layer includes a cobalt alloy and a cobalt-based, silicon-depressed braze alloy, i.e., the primary melting point depressant of the braze alloy is silicon. For instance, a MarM509 cobalt alloy (approximately 30% to approximately 70%) and a cobalt-based, silicon-depressed braze alloy (approximately 70% to approximately 30%) can be used. In such an embodiment, a compatible second layer can include a cobalt-based MCrAlY alloy and a cobalt-based, silicon-depressed braze alloy. In some embodiments, the cobalt-based, silicon-depressed braze alloy of the first and second layers can be the same, e.g., AMS 4783 braze alloy. However, various formulations can be used. By way of example, the cobalt-based, silicon-depressed braze alloys of the first and second layers could each contain less than approximately 1% boron. Notably, use of a boron-based braze material can detrimentally affect the abradable layer by altering melt characteristics and environmental capabilities due to the migration of the boron from the structural layer to the abradable layer.

Thicknesses of the layers can vary depending upon the application. By way of example, the first (structural) layer can vary between approximately 0.005" (0.127 mm) to approximately 0.060" (1.524 mm), while the second (abradable) layer can vary between approximately 0.020" (0.508 mm) to approximately 0.150" (3.81 mm).

Notably, the first layer can be thinner if configured to apply at each repair cycle to mitigate any base material loss during repair of the abradable layer. This tends to ensure almost no loss of base material wall thickness from cycle to cycle. The first layer could be thicker if the abradable seal component has been repaired several times without using a structural layer during those repairs, which could have resulted in a previous loss of wall thickness.

Preform 150 is configured to bond to the structural substrate, e.g., structural substrate 131 of a segment during a brazing process. Specifically, after such a process, the second layer 156 dimensionally restores the structural substrate and the third layer 158 serves as a repaired abradable layer of the segment. In this regard, an exemplary embodiment of a repair method is depicted in the flowchart of FIG. 5.

Figure 5:
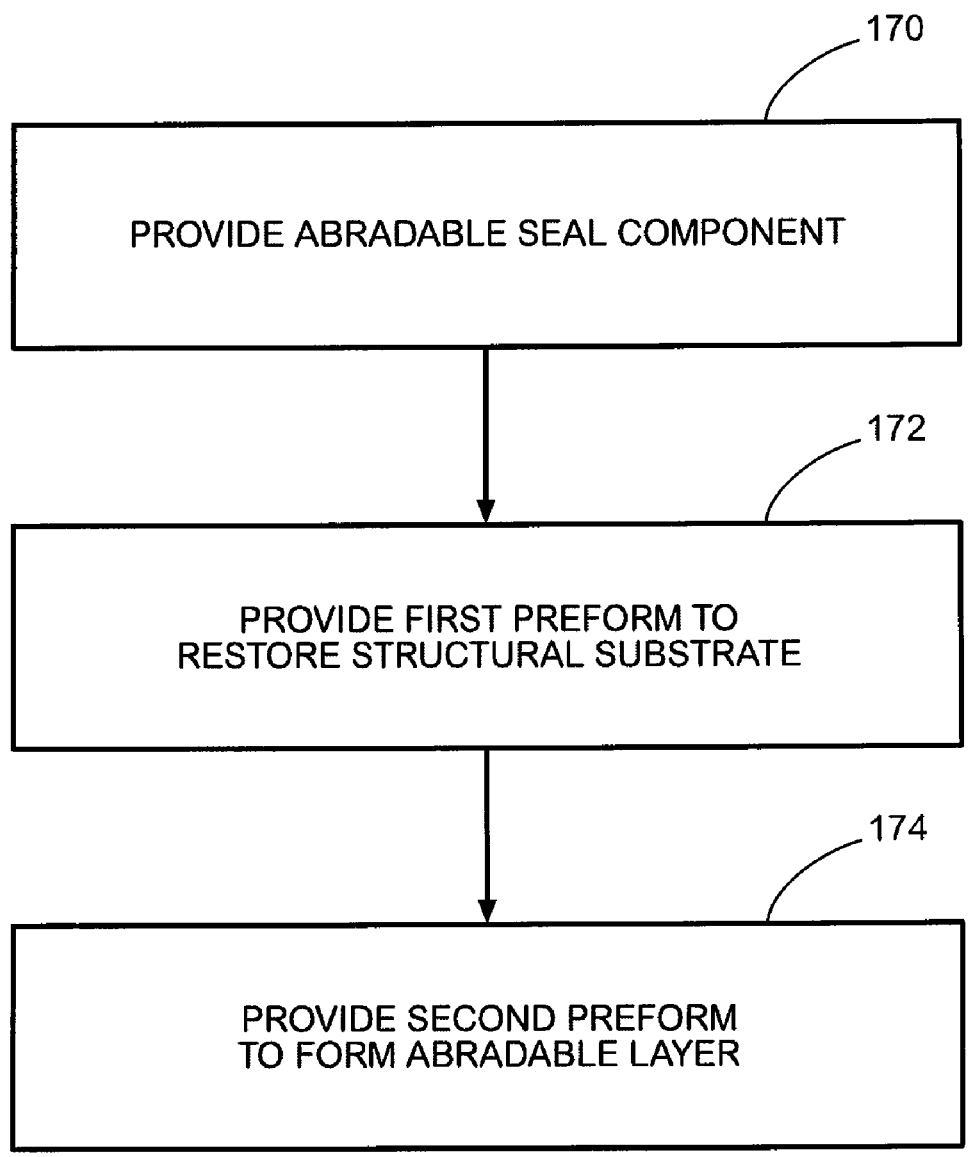
FIG. 5 is a flowchart depicting an exemplary embodiment of a method for repairing an abradable seal.

As shown in FIG. 5, the method may be construed as beginning at block 170, in which an abradable seal component of a gas turbine engine (e.g., an outer air seal segment) is provided. By way of example, the component can be an outer air seal segment removed from a gas turbine engine during overhaul. Notably, the component includes a structural substrate. In some embodiments, an associated abradable layer is removed from the structural substrate, such as by machining, grinding and/or chemical stripping. In block 172, a first preform is provided to restore the structural substrate, and a second preform is provided to form an abradable layer of the component (block 174). It should be noted that, in some embodiments, the aforementioned first and second preforms can be used separately to perform a repair. In other embodiment, first and second separate preforms can be used in a single brazing process. In still other embodiments, the first and second preforms can be provided as an integrated structure (such as depicted in the embodiment of FIG. 4, in which the layers are joined together (e.g., welded) prior to brazing with the component).

In some embodiments, one or more preforms can be used to restore the structural substrate and to form an abradable layer of a component simultaneously during a brazing process. In this regard, a representative brazing process can include subjecting the component and preform(s) to temperatures of between approximately 2200° F. (1204.4° C.) and approximately 2325° F. (1273.9° C.) for between approximately 20 minutes and approximately 10 hours, preferably between approximately 2250° F. (1232.2° C.) and approximately 2300° F. (1260° C.) for between approximately 1.5 hours and approximately 10 hours.

In some embodiments, presintering is performed to consolidate powder constituents used to manufacture the preforms. In other embodiments, various other material configurations of preforms can be used, such as tapes, for example.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for repairing an abradable seal of a gas turbine engine comprising:

providing an abradable seal component of a gas turbine engine, the seal component having a structural substrate; and using a preform made of first structural material and a second abradable material to simultaneously restore the structural substrate and form an abradable layer of the component.

2. The method of claim 1, wherein, in using the preform, the preform and the abradable seal component are subjected to a brazing process.

3. The method of claim 2, wherein the preform comprises a multilayer stack having a first layer and a second layer;

the first layer being operative to bond the multilayer stack to the structural substrate, the first layer comprising structural material corresponding to material of the structural substrate and braze material compatible with the structural material;

the second layer comprising abradable material operative to form a replacement abradable layer.

4. The method of claim 3, further comprising forming the preform.

5. The method of claim 3, wherein the structural material of the first layer comprises cobalt.

6. The method of claim 3, wherein:
wherein the structural material of the first layer comprises a cobalt alloy; and
the braze material of the first layer comprises a cobalt-based, silicon-depressed braze alloy.

7. The method of claim 6, wherein the first layer comprises a cobalt- based, silicon-depressed braze alloy.

8. A method for repairing an abradable seal of a gas turbine engine comprising:
providing an abradable seal component of a gas turbine engine, the seal component having a structural substrate;
providing a first preform to restore the structural substrate;
providing a second preform to form an abradable layer of the component and
brazing the component with the first preform and the second preform such that the first preform restores the structural substrate and the second preform forms the abradable layer wherein, during the brazing, the first preform is bonded to the component during a first brazing process and the second preform is bonded to the first preform during a second brazing process.

* * * * *